Patented Dec. 4, 1951

UNITED STATES PATENT OFFICE 2,576,949

ADDUCTS OF 9,11-OXIDO-BISNOR-CHOLA-DIENIC ACIDS

Robert H. Levin, Kalamazoo, Mich., assignor to The Upjohn Company, Kalamazoo, Mich., a corporation of Michigan No Drawing. Application December 4, 1948, Serial No. 63,614

9 Claims. (Cl. 260—239.55)

This invention relates to adducts of maleic anhydride, maleic acid and esters of maleic acid with 3-acyloxy-9,11-oxido-bisnor-5,7-choladienic acid and esters thereof and to a method for their preparation.

The adducts of this invention may be represented generally by the formula:

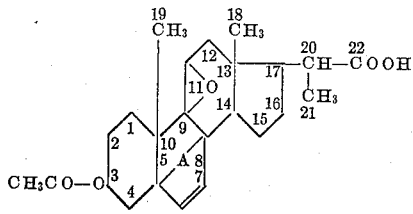

wherein A is an adduct radical or bridge derived from a member of the group consisting of aliphatic 1,2-olefinic-1,2-dicarboxylic acids such as maleic anhydride, maleic acid, and esters of maleic acid. The 3-acetyl radical of the compounds may be replaced by other acyl radicals such as propionyl, butyryl, benzoyl, et cetera.

The products if this invention are colorless crystalline solids, insoluble in water and aliphatic hydrocarbons, soluble in ether and halogenated aliphatic hydrocarbons and soluble in hot organic solvents, such as ethyl acetate, acetone and methanol, but less soluble in these latter organic solvents when cold.

The products of this invention, by removal of the adduct radical and hydrolysis, yield 3-hydroxy-9,11-oxido-bisnor-5,7-choladienic acid, and are useful as intermediates in the synthesis of other steroids having an oxygen radical attached to the carbon atoms in the 9 and 11 positions.

The 3-acetoxy-9,11-oxido-bisnor-5,7-choladienic acid adducts with maleic anhydride and esters thereof of this invention can be obtained by the epoxidation of the 9–11 double bond of adducts of 3-acetoxy-bisnor-5,7,9-cholatrienic acid and esters thereof, or ozonides which will yield such products, by means of peroxides such as hydrogen peroxide, benzoyl peroxide, perbenzoic acid and perphthalic acid.

The adducts of 3-acetoxy-bisnor-5,7,9-cholatrienic acid and esters thereof can be obtained as described and claimed in my concurrently filed copending application Serial 63,613. According to one of the preferred methods of my copending application, the maleic anhydride adduct of ergosterol is transformed into the adduct of dehydroergosteryl acetate by the use of mercuric acetate (Ann. 465 157 (1928)). The maleic anhydride adduct of dehydroergosteryl acetate thus obtained is ozonized by passing into a solution of the adduct, preferably a solution in methylene dichloride, maintained at a temperature of between plus 25 and minus 30 degrees centigrade, from 1.25 to 2.5 moles of ozone per mole of adduct, decomposition of the resulting 22–23 ozonide under mild oxidizing conditions and separation of the maleic anhydride adduct of 3-acetoxy-bisnor-5,7,9-cholatrienic acid.

When the 22–23 ozonide of the maleic anhydride adduct of dehydroergosterol acetate is decomposed and oxidized with 30 percent hydrogen peroxide under more severe oxidizing conditions or with more highly reactive oxidizing agents, the maleic anhydride adduct of 3-acetoxy-9,11-oxido-bisnor-5,7-choladienic acid may be isolated from the reaction mixture as its water-soluble barium salt.

The preferred procedure for preparing 3-acetoxy-9,11-oxido-bisnor-5,7-choladienic acid in accordance with my invention, however, is to epoxidize the maleic anhydride adduct of 3-acetoxy-bisnor-5,7,9-cholatrienic acid or its esters (which are more particularly referred to in my above-identified copending application) with perbenzoic or perphthalic acid under controlled conditions. Such controlled oxidation of the double bond may be carried out by mixing a solution of the maleic anhydride adduct of methyl 3-acetoxy-bisnor-5,7,9-cholatrienate in ether or methylene dichloride with about two molecular equivalents of a solution of monoperphthalic or perbenzoic acid. The solution is allowed to stand for several hours at room temperature or below and then may be heated under reflux, although if the reaction has been allowed to proceed sufficiently long at a lower temperature the heating may be omitted. After completion of the epoxidation the solvent is removed, the perbenzoic or perphthalic acid separated by dissolving the reaction product in chloroform and filtering from undissolved material. The chloroform is evaporated and the residue crystallized from acetone or a mixture of acetone and methanol.

The following examples are given for purposes of illustrating the invention but it is to be understood that the invention is not restricted thereto.

*Preparation 1.—Maleic anhydride adduct of 3(beta)-acetoxy-bisnor-5,7,9-cholatrienic acid*

A solution of 30.0 grams (0.056 mole) of the 5,8-maleic anhydride adduct of dehydroergosteryl acetate in 600 milliliters of methylene chloride was cooled to minus 78 degrees centigrade and maintained at that temperature while 3.544 grams of ozone (1.3 moles per mole of adduct) was passed through over a period of three hours. The reaction mixture was diluted with 500 milliliters of glacial acetic acid and the methylene chloride was fractionally distilled in vacuo. An additional 200 milliliters of acetic acid was added, the solution was cooled to 15 degrees centigrade and the ozonide was decomposed by adding 44 grams of zinc dust, in portions, with mechanical stirring. The temperature was kept between 15 and 20 degrees centigrade. This required thirty minutes. One milliliter of one percent silver nitrate solution was added, and stirring was continued for twenty minutes until a test for peroxide with starch-iodine paper was negative. The zinc was separated by filtration and washed with acetic acid.

The combined acetic acid solution was then cooled to 18 degrees and stirred mechanically while being treated with a solution of chromic acid (11.2 grams in ten milliliters of water and 30 milliliters of acetic acid) for a period of three and one-half hours. The excess chromic acid was destroyed by the addition of 15 milliliters of methanol and two grams of sodium bisulfite, and the reaction mixture was poured into two liters of water. The product precipitated and was separated by filtration and washed with water. Yield 22.1 grams (82 percent) of the 5,8-maleic anhydride adduct of 3(beta)-acetoxy-bisnor-5,7,9-cholatrienic acid, melting point 226–237 degrees centigrade. Recrystallization from methanol and from etherhexane gave 11.1 grams (55 percent) of purified product, melting point 239.5–243 degrees centigrade. Its percentage analysis was as follows:

Calculated for $C_{28}H_{34}O_7$ --- C 69.69  H 7.10
Found _____ 69.73  7.17

*Preparation 2.—Maleic anhydride adduct of methyl-3(beta)-acetoxy-bisnor-5,7,9-cholatrienate*

Ten milliliters of diazomethane dissolved in methylene dichloride was added to a suspension of one gram of the maleic anhydride adduct of 3(beta)-acetoxy-bisnor-5,7,9-cholatrienic acid (prepared as described in Preparation 1) in ten milliliters of ether under room conditions and allowed to stand for an additional fifteen minutes. After removal of the excess diazomethane by distillation, the residual ether solution was filtered and cooled. There was obtained 0.82 gram of the methyl ester of the maleic anhydride adduct of 3(beta)-acetoxy-bisnor-5,7,9-cholatrienic acid melting at 242–244.5 degrees centigrade. Crystallization from a mixture of methylene dichloride and ether raised the melting point to 245–247.5 degrees centigrade. The product had the following percentage analysis:

Calculated for $C_{29}H_{36}O_7$ _____ C 70.14  H 7.31
Found _____ 69.98  7.48

*Preparation 3.—Maleic acid adduct of 3(beta)-hydroxy-bisnor-5,7,9-cholatrienic acid*

Nine hundred milligrams of the maleic anhydride adduct of 3(beta)-acetoxy-bisnor-5,7,9-cholatrienic acid (prepared by the method described in Preparation 1) was dissolved in a minimum of methanol. A twenty percent excess of potassium hydroxide dissolved in five milliliters of methanol was added and the reaction mixture heated on the steam bath for one hour. After cooling to room temperature, ten percent hydrochloric acid was added dropwise to the methanolic solution until it became just acid to litmus. The acidic solution was then diluted with 25 milliliters of saturated sodium chloride solution and the resulting heavy white precipitate was extracted with five separate 25-milliliter portions of ether. The combined ether extracts were washed free from acid with saturated sodium chloride solution, dried over anhydrous sodium sulfate, filtered and concentrated to 75 milliliters. Upon cooling the solution, shiny crystals of the maleic acid adduct of 3(beta)-hydroxy-bisnor-5,7,9-cholatrienic acid formed which, when removed by filtration and dried, melted at 221–225 degrees centigrade. Total yield of product was 77.5 percent.

*Preparation 4.—Trimethyl ester of the maleic acid adduct of 3(beta)-hydroxy-bisnor-5,7,9-cholatrienic acid*

An excess of diazomethane in methylene chloride solution was allowed to react for sixteen hours at room temperature with 640 milligrams of the maleic acid adduct of 3(beta)-hydroxy-bisnor-5,7,9-cholatrienic acid (prepared as described in Preparation 3) for sixteen hours at room temperature. The solution was filtered and concentrated to ten milliliters on the steam bath. Shiny platelets formed. After three crystallizations from methanol and one from acetone, these platelets of the trimethyl ester of the maleic acid adduct of 3(beta)-hydroxy-bisnor-5,7,9-cholatrienic acid, had a melting point of 222–227 degrees centigrade. The percentage analysis was as follows:

Calculated for $C_{29}H_{40}O_7$ _____ C 69.57  H 8.05
Found _____ 69.81  8.32

*Preparation 5.—Trimethyl ester of the maleic acid adduct of 3(beta)-acetoxy-bisnor-5,7,9-cholatrienic acid*

A solution of 500 milligrams of the trimethyl ester of the maleic acid adduct of 3(beta)-hydroxy-bisnor-5,7,9-cholatrienic acid (prepared as described in Preparation 4) in 20 milliliters of acetic anhydride was boiled for one-half hour and poured into 100 milliliters of a water-ice mixture. The resulting oil was washed with water, the water decanted and the residual oil scratched until it solidified. The trimethyl ester of the maleic acid adduct of 3(beta)-acetoxy-bisnor-5,7,9-cholatrienic acid thus obtained was collected, washed free of acetic acid with water and recrystallized twice from a mixture of three parts of ether and one part of hexane. The recrystallized product melted at 192.5–195 degrees centigrade and its percentage analysis was as follows:

Calculated _____ C 68.61  H 7.80  $CH_3CO$ 9.05
Found _____   68.69   7.75   8.14±1%

EXAMPLE 1.—*Trimethyl ester of the maleic acid adduct of 3-acetoxy-9,11-oxido-bisnor-5,7-choladienic acid*

Ten grams of the adduct of dehydroergosteryl acetate and maleic anhydride was dissolved in 200 milliliters of methylene chloride cooled in a Dry Ice-acetone bath to about minus 30 degrees centigrade. Ozone was passed into this solution at a rate of 26 milligrams per minute until two moles of ozone per mole of adduct was added. The methylene dichloride was replaced with glacial acetic acid by adding 100 milliliters of glacial acetic acid and removing the methylene dichloride by fractional distillation under reduced pressure. To the solution of the maleic anhydride adduct of 3-acetoxy-dehydroergosterol-22,23-ozonide in acetic acid was then added ten milliliters of a thirty percent hydrogen peroxide solution after which the solution was warmed to about 95 degrees centigrade for one hour. The reaction mixture containing the maleic anhydride adduct of 3-acetoxy-9,11-oxido-bisnor-5,7-choladienic acid was then poured into 500 milliliters of water, the precipitate which separated was collected, washed with water, dried and treated with acetic anhydride. The acetic anhydride solution was dissolved in 200 milliliters of ether and the ether solution extracted with a cold saturated solution of barium hydroxide in water. The barium hydroxide solution was separated from any precipitate which formed and the clear solution was acidified with dilute hydrochloric acid. The precipitate which formed upon acidification was extracted from the aqueous solution with ether. The ether solution was dried, the ether removed and the residue treated with diazomethane in ether. After removal of the excess diazomethane the products were acetylated with acetic anhydride. The excess acetic anhydride was destroyed by means of water, the product extracted with ether, the ether removed and the residue crystallized from dilute aqueous methanol. The mother liquors remaining after the removal of the precipitate were combined and evaporated to dryness. The solid residue was sublimed at 150–160 degrees centigrade at a pressure of $5 \times 10^{-4}$ millimeters of mercury; the sublimate, which was the trimethyl ester of the maleic acid adduct of 3-acetoxy-9,11-oxido-bisnor-5,7-choladienic acid, melted, after crystallization from an ether-hexane mixture and dilute methanol, at 184–190 degrees centigrade. Its percentage analysis was as follows:

Calculated _____ C 66.64   H 7.58
Found _____  66.40     8.10

EXAMPLE 2.—*Maleic anhydride adduct of methyl-3-acetoxy-9,11-oxido-bisnor-5,7-choladienate*

A solution of 465 milligrams of the maleic anhydride adduct of methyl-3(beta)-acetoxy-bisnor-5,7,9-cholatrienate (prepared as described in Preparation 2) in fifty milliliters of ether and 25 milliliters of methylene dischloride was mixed under prevailing room conditions with 32.0 milligrams (two molecular equivalents) of monoperphthalic acid dissolved in ether. The mixture was allowed to stand under room conditions for about two hours after which it was heated under reflux for an additional two hours. The solvent was then removed and the dry residue digested with hot chloroform. The hot chloroform solution was filtered from the undissolved phthalic acid, and the chloroform removed under reduced pressure from the filtrate. The dry residue was crystallized from a mixture of acetone and methanol, yielding 440 milligrams of the maleic anhydride adduct of methyl-3(beta)-acetoxy-9,11-oxido-bisnor-5,7-choladienate melting at 257–260 degrees centigrade. Further crystallizations gave a product melting at 258.5–260.5 degrees centigrade. Its percentage analysis was as follows:

Calculated for $C_{29}H_{36}O_8$_____ C 67.95   H 7.08
Found _____   68.22     7.02

EXAMPLE 3.—*Trimethyl ester of the maleic acid adduct of 3(beta)-acetoxy-9,11-oxido-bisnor-5,7-choladienic acid*

A solution of 497 milligrams of the trimethyl ester of the maleic acid adduct of 3(beta)-acetoxy-bisnor-5,7,9-cholatrienic acid (prepared as described in Preparation 5) dissolved in sixty milliliters of ether was mixed under room conditions with a solution of 366 milligrams of monoperphthalic acid (two molar equivalents) dissolved in twelve milliliters of ether. After mixing, the solution was allowed to stand at plus five degrees centigrade for two days. The ether was then removed by distillation and the dry residue digested with hot chloroform. The chloroform solution was filtered to remove the insoluble phthalic acid and the filtrate evaporated to dryness. The residue on crystallization from acetone gave the trimethyl ester of the maleic acid adduct of 3(beta)-acetoxy-9,11-oxido-bisnor-5,7-choladienic acid melting at 208–209.5 degrees centigrade and having the following percentage analysis:

Calculated for $C_{31}H_{42}O_9$_____ C 66.64   H 7.58
Found _____   66.76     7.64

Inasmuch as the foregoing description comprises preferred embodiments of my invention it is to be understood that variations and modifications may be made therein in conventional manner and that my invention is not to be limited in scope except as defined in the appended claims.

I claim:

1. An adduct of the group consisting of (a) 3-substituted-9,11-oxido-bisnor-5,7-choladienic acid adducts having the general formula:

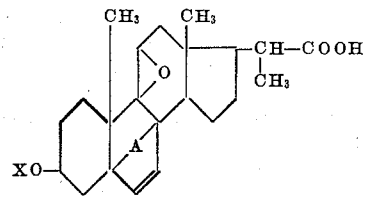

wherein A is an adduct radical of a dienophile selected from the group consisting of maleic acid, maleic acid anhydride, and lower-alkyl diesters of maleic acid, and wherein X is an acyl group selected from the class consisting of lower fatty acid acyl and benzoyl groups, and (b) lower-alkyl esters thereof.

2. An adduct of 3-acetoxy-9,11-oxido-bisnor-5,7-choladienic acid and maleic anhydride, having the formula:

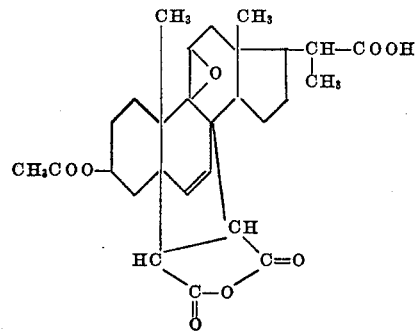

3. An adduct of methyl-3-acetoxy-9,11-oxido-bisnor-5,7-choladienate and maleic anhydride, having the formula:

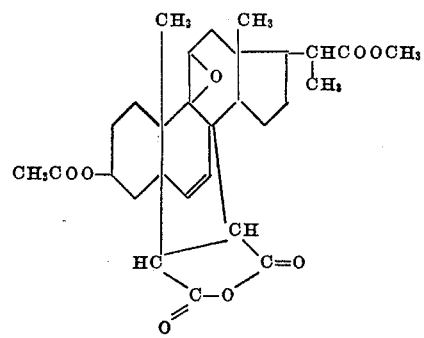

4. The trimethyl ester of the maleic acid adduct of 3-acetoxy-9,11-oxido-bisnor-5,7-choladienic acid, having the formula:

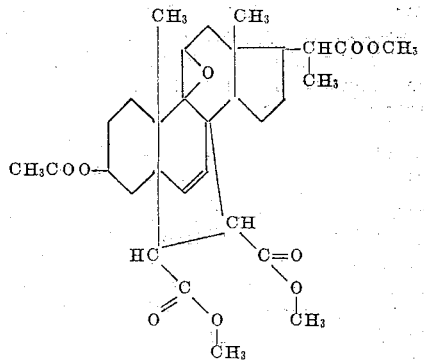

5. A process for the production of an adduct of a 3-substituted-9,11-oxido-bisnor-5,7-choladienic acid and lower-alkyl esters thereof, which comprises: oxidizing with an oxidizing agent of the group consisting of hydrogen peroxide, benzoyl peroxide, perbenzoic acid, and monoperphthalic acid, a solution of a compound selected from the group consisting of adducts of 3-substituted-bisnor-5,7,9(11)-cholatrienic acids and lower-alkyl esters thereof, having the general formula:

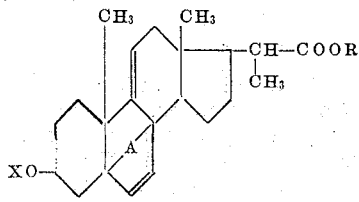

wherein A is an adduct radical of a dienophile selected from the group consisting of maleic acid, maleic acid anhydride, and maleic acid lower-alkyl diesters, wherein X is an acyl group selected from the class consisting of lower fatty acid acyl and benzoyl groups, and wherein R is a member of the group consisting of hydrogen and a lower-alkyl radical, the oxidizing agent being employed in the proportion of approximately two molecular equivalents for each mole of the starting adduct, and recovering the corresponding 3-substituted-9,11-oxido-bisnor-5,7-choladienic adduct from the reaction mixture.

6. The method of claim 5, wherein the starting adduct is the maleic anhydride adduct of methyl 3-acetoxy-bisnor-5,7,9(11)-cholatrienate.

7. The method of claim 5, wherein the starting adduct is the maleic anhydride adduct of a methyl 3-acyloxy-bisnor-5,7,9(11)-cholatrienate.

8. The method of claim 5, wherein the starting adduct is the dimethyl maleate of methyl 3-acetoxy-bisnor-5,7,9(11)-cholatrienate.

9. The method of claim 5, wherein the starting adduct is the dimethyl maleate of a methyl 3-acyloxy-bisnor-5,7,9(11)-cholatrienate.

ROBERT H. LEVIN.

REFERENCES CITED

The following references are of record in the file of this patent:

Inhoffen, Annalen, vol. 508 (1934), pp. 81–88.
Honigmann, Annalen, vol. 508 (1934), pp. 89–104.